United States Patent [19]

Kashida et al.

[11] Patent Number: 4,740,845
[45] Date of Patent: Apr. 26, 1988

[54] DATA RECORDING APPARATUS

[75] Inventors: Motokazu Kashida, Tokyo; Masahiro Takei, Kanagawa; Kouji Takahashi, Kanagawa; Toshiyuki Masui, Kanagawa; Tsutomu Fukatsu, Kanagawa; Kenichi Nagasawa, Kanagawa, all of Japan

[73] Assignee: Canon Kabushiki Kaisha, Tokyo, Japan

[21] Appl. No.: 833,345

[22] Filed: Feb. 25, 1986

[30] Foreign Application Priority Data

Feb. 27, 1985 [JP] Japan .................................. 60-038577

[51] Int. Cl.[4] ............................ G11B 5/09; G11B 5/00
[52] U.S. Cl. .......................................... 360/48; 360/32
[58] Field of Search ................ 360/32, 48, 40; 369/59

[56] References Cited

U.S. PATENT DOCUMENTS 4,622,600 11/1986 Okamoro et al. ...................... 360/32
4,633,329 12/1986 Sugiyama et al. ..................... 360/32

Primary Examiner—Vincent P. Canney
Attorney, Agent, or Firm—Toren, McGeady & Associates

[57] ABSTRACT

In an apparatus for recording a data sequence including main binary data of an (m X n) number of bits formed by sampling a main information signal and a plurality of subordinate binary data of also an (m X n) number of bits respectively carrying additional information of varied kinds, recording tracks are formed one after another with data which includes the main binary data representing the main information signal sampled within a given period of time and the plurality of subordinate binary data recorded in each of the tracks; and recording is performed in such a manner that, among the plurality of subordinate binary data, the meaning of information carried by a second n number of bits varies according as the condition of the data varies between a case where l-adic numerical data is arranged to be formed by a first n number of bits within the plurality of subordinate binary data and another case where irregular data is formed there as the l-adic numerical data cannot be formed by the first n number of bits (n and m being integers, respectively, and l being an integer not exceeding $2^n$).

20 Claims, 7 Drawing Sheets

DATA RECORDING APPARATUS

BACKGROUND OF THE INVENTION

1. Field of the Invention

This invention relates to a data recording apparatus, and more particularly, to an apparatus for recording a data, sequence including main binary data formed by sampling a main information signal, and a plurality of subordinate binary data which respectively carry additional information of varied kinds.

2. Description of the Prior Art

In the following description, the present specification takes up, by way of example, a tape recorder of the kind wherein a magnetic recording tape is wrapped at a given angle around a cylinder which is equipped with rotary heads; and digital audio signals are recorded or reproduced, as main information, by means of the heads in or from a plurality of areas longitudinally arranged on the recording tape.

FIG. 1 of the accompanying drawings shows the tape transport system employed by the conventional tape recorder of the above-stated kind. FIG. 2 shows recording tracks formed on a tape by the tape recorder.

While the head 3 or 4 traces distances from a point A to a point B, from the point B to a point C, from the point C to a point D, from the point D to a point E, from the point E to a point F and from the point F to another point G, audio signals can be recorded in areas CH1 to CH6. These areas CH1 to CH6 thus can be used for recording different audio signals therein, respectively. An operation called azimuth-overwrite is performed on these areas. However, the tracks of these areas CH1-CH6 do not have to be on the same straight line. Each of the areas CH1-CH6 has one pilot signal recorded therein for tracking control. Different pilot signals are thus recorded in different areas in the order of rotation f1 f2→f3→f4. However, there is no correlation between them.

Referring further to FIG. 1, recording or reproduction is carried out in or from these areas CH1 to CH3 while the tape 1 is travelling at a predetermined speed in the direction of arrow 7, and in or from the areas CH4 to CH6 while the tape is travelling in the direction of arrow 9. Therefore, as shown in FIG. 2, the inclination of the areas CH1 to CH3 somewhat differs from that of the areas CH4 to CH6. With regard to a difference in the relative speed of the tape and the head for these groups of areas, a difference arising from the travel of the tape 1 is extremely small as compared with a difference arising from the rotation of the heads 3 and 4. Therefore, the difference in the relative speed presents no problem.

FIGS. 3(a) to 3(j) show, in a time chart, the recording or reproducing operation of the tape recorder which is arranged as described above. A phase detection pulse (hereinafter referred to as a PG signal) is generated in synchronism with the rotation of the cylinder 2 as shown at FIG. 3(a). The PG signal is a rectangular wave of 30 Hz repeating a high level (hereinafter referred to as an H level) and a low level (hereinafter referred to as an L level) alternately with each other at intervals of 1/60 sec. Another PG signal, which is of the opposite polarity to the PG signal of FIG. 3(a), is shown in FIG. 3(b). The first PG signal is at an H level while the head 3 is rotating from the point B to the point G of FIG. 1. The other PG signal shown in FIG. 3(b) is at an H level while the other head 4 is rotating from the point B to the point G.

Pulses for reading data are obtained from the PG signal of FIG. 3(a) as shown in FIG. 3(c). The data reading pulses are used for sampling the audio signal of a period corresponding to one field (1/60 sec). FIG. 3(d) shows, by H level parts thereof, periods provided for signal processing on the one field portion of the sampled audio data by adding an error correcting redundant code or by changing the arrangement thereof by means of a RAM or the like. FIG. 3(e) shows a signal indicating data recording periods at H level parts thereof which represent timing for recording, on the tape 1, the recording data obtained through the signal processing operation mentioned above.

Referring to FIGS. 3(a) to 3(j), the temporal flow of signals are, for example, as follows: The data sampled during a period from a point of time t1 to a point of time t3, i.e. while the head 3 is moving from the point B to the point G, is subjected to a signal processing operation during a period from the point of time t3 to a point of time t5, i.e. while the head 3 is moving from the point G to the point A and are then recorded during a period from the point of time t5 to a point of time t6, or while the head 3 is moving from the point A to the point B. In other words, the data is recorded by the head 3 in the area CH1 as shown in FIG. 2. Meanwhile, the data which is sampled while the PG signal of FIG. 3(b) is at an H level, is also processed at a similar timing before it is recorded in the area CH1 by the head 4.

FIG. 3(f) shows another PG signal which is obtained by shifting the phase of the PG signal of FIG. 3(a) to a predetermined degree, which corresponds to one area, and is 36 degrees in this specific instance.

An audio signal recording operation using the PG signal of FIG. 3(f) and a PG signal which is not shown but is of an opposite polarity to the former is performed in the following manner: The data which is sampled during a period between the points of time t2 and t4 is subjected to a signal processing operation during a period between the points of time t4 and t6 in accordance with the signal of FIG. 3(g) and is recorded during a period between the points of time t6 and t7 in accordance with the signal of FIG. 3(h). In other words, the data is recorded in the area CH2 of FIG. 2 while the head is moving from the point B to the point C. Meanwhile, another data which is sampled during the points of time t4 and t7 is likewise recorded in the area CH2 by means of the other head during a period between the points of time t4 and t7.

The signal which is recorded in the area CH2 in the manner as described above is reproduced in the following manner:

The head 3 reads the data from the tape 1 in accordance with a signal shown in FIG. 3(h) during the period between the points of time t6 and t7 (and also during the period between the points of time t1 and t2). Then, during the period between the points of time t7 and t8 also (between t2 and t3), the reproduced signal is subjected to a signal processing operation which is carried out, in a manner reverse to the signal processing operation performed for recording, in accordance with a signal shown in FIG. 3(i). In other words, error correction and other processes are carried out during this period. Then, during a period between points of time t8 and t9, the reproduced audio signal which has been thus processed is produced in accordance with a signal shown in FIG. 3(j). The reproducing operation of the head 4 is of course performed with a phase difference of 180 degrees from the above-stated reproduction by the head 3, so that a continuous reproduced audio signal can be obtained.

For other areas CH3 to CH6, it goes without saying that the recording and reproducing operations are performed on the basis of the PG signal of FIG. 3(a) by phase shifting it as much as n×36 degrees. This is independent of the travelling direction of the tape.

An example of the conventional data formats employed for the apparatus of the above-stated kind is as follows: FIG. 4 shows a data format for data to be recorded within each of the recording tracks formed in each of the areas shown in FIG. 2. In other words, in this format, the data includes the PCM audio data which corresponds to a 1/60 sec. portion of a two-channel audio signal.

In the data matrix of FIG. 4, a column SYNC represents a data train for synchronization. A column ADDRESS represents an address data train. Columns P and Q represent redundant data trains for error correction. A column CRCC represents a CRCC check code data train. Columns D1 and D2 respectively include a plurality of columns. The plurality of columns of each of the columns D1 and D2 carry audio signal information of two channels. Meanwhile, lines b(0) to b(3x-1) represent the lines of the data matrix. Each of these lines forms one block of data, which are recorded one after another from the left-hand side to the right. For example, the data of the coloumn ADDRESS in the line b(0) is recorded next to the data of the column SYNC in the line b(0) and is then followed by the data of the column P in the line b(0). Further, the data of the last column in the line b(x) is followed by the data of the column SYNC in the line b(x+1). Data recording for one track is completed when the data of the last column in the line b(3x-1) is recorded.

The six data ID0 to ID5 of the first column among the plurality of columns D1 in lines b(0), b(1), b(x), b(x+1), b(2x) and b(2x+1) corresponds to additional information other than the information of the audio signal. Hereinafter, these six data will be called ID data.

In the field of the art of recording digitized information signals on recording media, the technology for data recording in a high degree of density is advancing. The advanced technology has come to allow a greater latitude for the data format to be employed in recording data on the medium. As a result, recording apparatuses for recording data in similar recording formats have come to be compatible. Therefore, for interchangeability among them, it is preferable that information about the recording format employed be recorded in some suitable form on the recording medium. Further, with the high density recording having become possible, it has become feasible to record an analog information signal over an extremely long period of time. Hence, it is also preferable to have information about time and programs likewise recorded. Since the analog information signal is to be recorded in the form of digital data, it is advantageous to have the above-stated time and program information recorded on the recording medium also in the form of digital data consisting of the same number of bits as the information signal, because such arrangement does not hinder the high density recording arrangement. The above-stated ID data is recorded on the basis of this concept.

These ID data are intended not only to be reproduced in carrying out normal reproduction, but also to be used for other purposes. The data for look-up and the data indicative of time information are often required to be quickly picked up by allowing the tape to travel at a high speed. However, with the tape allowed to travel at a high speed, it becomes hardly possible to have all these ID data reproduced in exactly the same state as they are recorded because of deviation of the tracing locus of the rotary head from recording tracks. FIG. 5 shows this.

Referring to FIG. 5, a reference symbol S1 denotes the tracing locus of a rotary head of plus azimuth and a symbol S2 the tracing locus of a rotary head of minus azimuth. Oblique full lines represent boundary lines between recording tracks. Symbols X, Y and Z denote the recorded positions of the above-stated data ID0 and ID1, the data ID2 and ID3 and the data ID4 and ID5. Hatched parts represent the parts of the recording tape from which reproduction outputs are obtained.

As is apparent from FIG. 5, the ID data are reproduced from different recording tracks by one stroke of tracing. Meanwhile, the kinds of information desired to be added in the form of the ID data are trending to increase in number. To meet this trend, it has been attempted to contrive different modes of recording these ID data. However, with one of such different recording modes applied to the data ID0 to ID5, if the mode varies at every track, the meaning of four ID data would become hardly discernible when the tape is allowed to travel at a high speed. While FIG. 5 shows an ideal tracing locus, sometimes it would be possible to reproduce only some of the ID data recorded in the positions X, Y and Z depending on the travelling speed of the tape.

Further, while all the look-up data of the above-stated kind are preferably recorded in one and the same ID data recording mode, such arrangement does not allow any increase in the amount of additional information as the amount of information recordable in a single recording mode is limited. To solve this problem, use of a sub-recording mode is conceivable. However, even according to that method, it sometimes becomes difficult to adequately discern necessary information depending on the travelling speed of the tape. Besides, adoption of that method would result in a further decreased number of bits usable for recording additional information.

SUMMARY OF THE INVENTION

It is an object of the present invention to provide a data recording apparatus which can solve the above mentioned problems.

Another object of the present invention is to increase an amount of additional information included in subordinate data which are to be recorded together with main data, obtained by sampling main information signal, without increasing an amount of data of the subordinate data.

Further, another object of the present invention is to provide a recording apparatus which can record additional information in such manner that the kind of the additional information can be easily distinguished at a time of a reproduction at any travelling speed of a recording medium without increasing an amount of data, when an amount of this additional information is increased and a recording thereof is made.

These objects achieved in a data recording apparatus, according to the subject invention as an embodiment thereof comprising:

means for forming, by sampling a main information signal, main binary data consisting of an n number of bits, n being an integer; means for forming a plurality of subordinate binary data of an n number of bits representing additional information of different kinds respectively, one of said plural subordinate binary data being mode number data which is arranged to determine the meaning of the additional information carried by other subordinate binary data; means for recording said main binary data and said plurality of subordinate data, said recording means forming recording tracks having a first magnetizing direction alternately tracks having a second magnetizing direction which differs from said first magnetizing direction; and means for forming a data sequence including said main binary data and said plurality of subordinate data to supply said data sequence to said recording means with a timing so that said main binary data sampled during a predetermined period of time and said plurality of subordinate binary data and said plurality of subordinate binary data are recorded on the one track by said recording means, and all of said mode number data recorded in the tracks of said first magnetizing direction are first data, while at least some of said mode number data recorded in said recording tracks of said second magnetizing direction are second data which differs from said first data.

Still another object of the present invention is to provide a recording apparatus which can record additional information in such manner that a great amount of the additional information can be read out efficiently at a time of reproduction, when the amount of the additional information is increased and a recording thereof is made.

This object is achieved in a data recording apparatus, according to the subject invention as another embodiment thereof, comprising:

means for forming, by sampling a main information signal, main binary data consisting of an n number of bits, n being an integer; means for forming a plurality of subordinate binary data of an n number of bits indicative of different kinds of additional information respectively, the plurality of subordinate binary data including first subordinate binary data consisting of an i number of its (i being an integer not exceeding n) and (n−i) number of bits, said i number of bits being arranged to determine the information represented by said (n−i) number of bits; means for recording said main binary data and said plurality of subordinate data, said recording means forming recording tracks one after another; and means for forming a data sequence including said main binary data and said plurality of subordinate data to supply said data sequence to said recording means with a timing so that said main binary data sampled during a predetermined period of time and said plurality of subordinate binary data are recorded on the one track by said recording on the one track by said recording means, and a plurality of kinds of said first subordinate data respectively including said i number of bits of different kind is periodically recorded by said recording means in a predetermined number of recording tracks within each recording period of said first subordinate data.

Other objects than what is mentioned above and the characterizing features of the present invention can be made clear by the detailed explanation on the embodiments of the invention, referring to the drawings which follow hereunder.

DETAILED DESCRIPTION OF THE PREFERRED EMBODIMENTS

Figure 1:
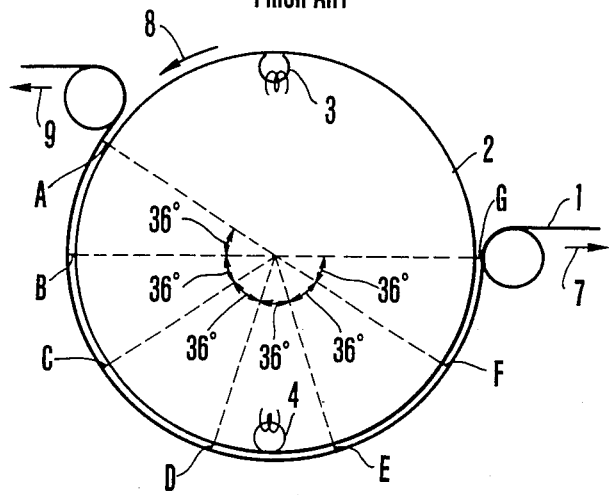
FIG. 1 is a schematic illustration of a tape transport system of the conventional tape recorder.
Figure 2:
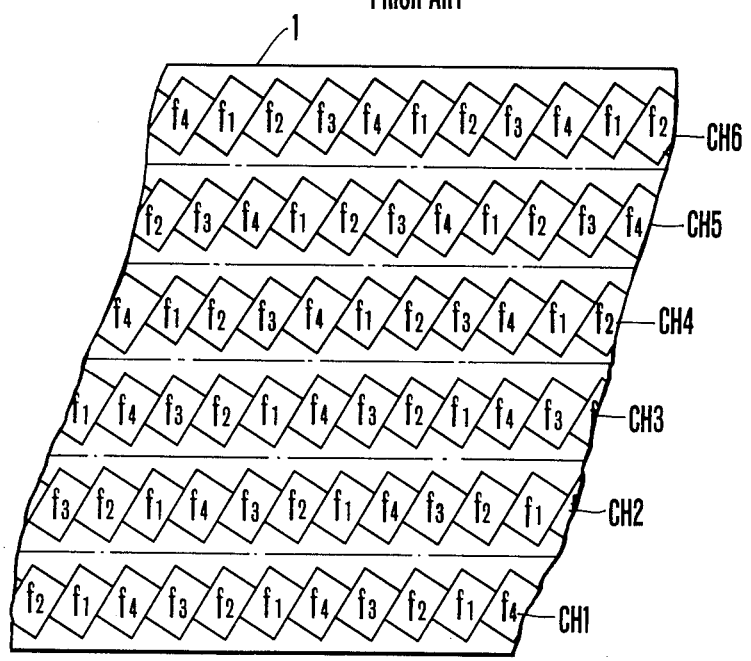
FIG. 2 shows a recording format employed by the tape recorder of FIG. 1.
Figure 3:
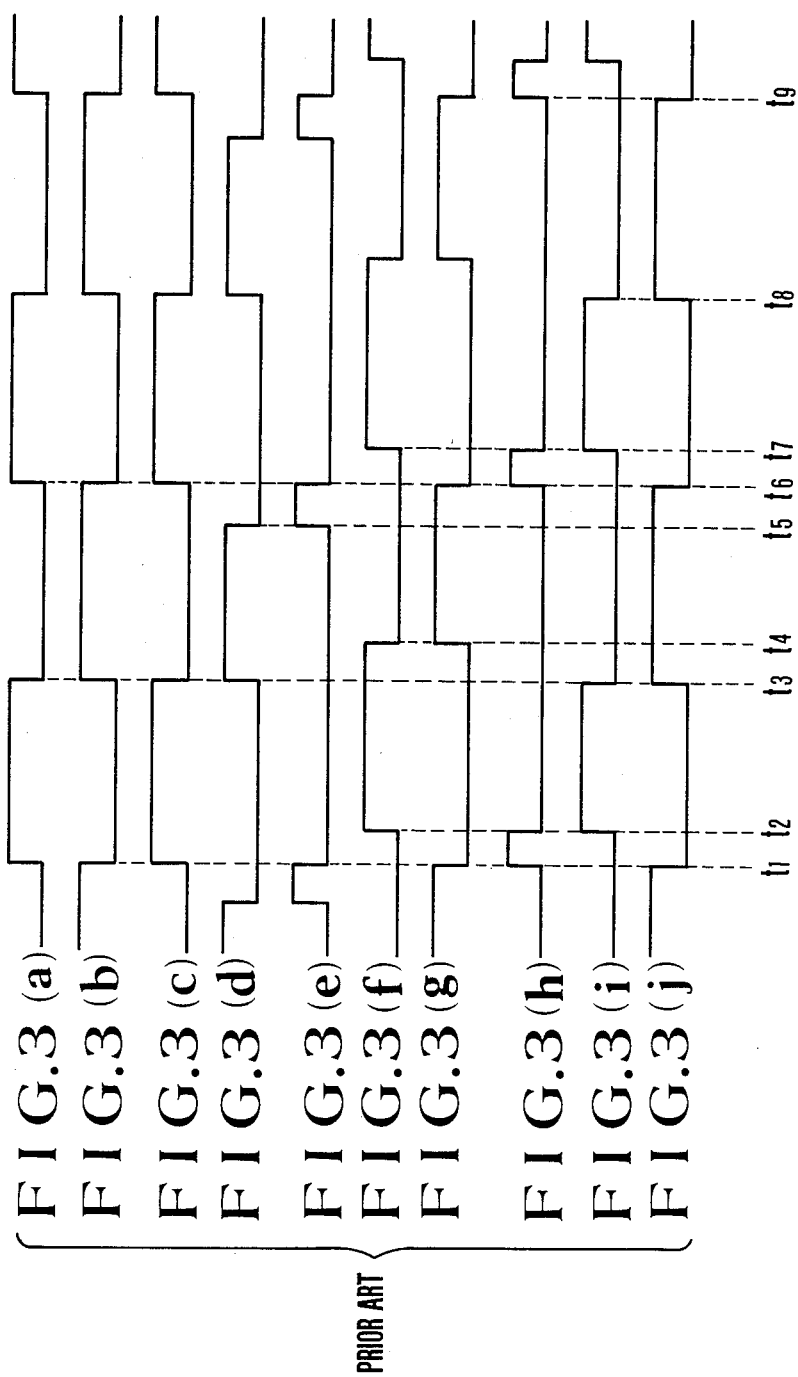
FIG. 3, consisting of 3(a) through 3(j), is a timing chart showing the recording and reproducing operation timing of the tape recorder shown in FIG. 1.
Figure 6:
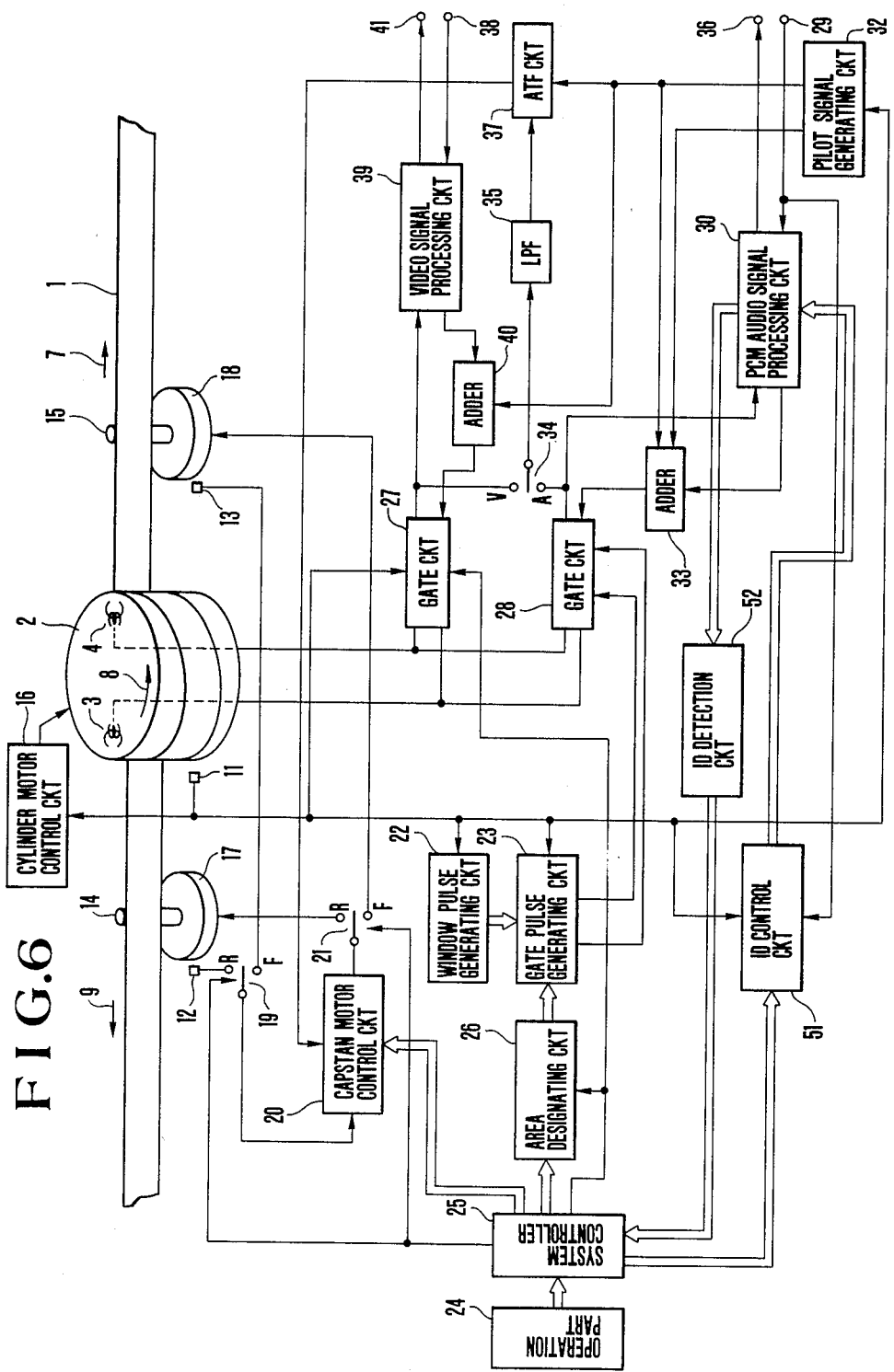
FIG. 6 is a block diagram showing, in outline, the arrangement of the tape recorder arranged as an embodiment of this invention.

FIG. 6 shows in outline the arrangement of a recorder which is of the kind described in the foregoing and is arranged according to this invention. In FIG. 6, the same parts as those shown in FIGS. 1 and 2 are indicated by the same reference numerals.

A PG signal, which is obtained from a detector 11 detecting the rotation of the rotary cylinder 2, is supplied to a cylinder motor control circuit 16. Upon receipt of the PG signal, the circuit 16 causes the cylinder 2 to be rotated at a given rotating speed and at a given rotation phase. Rotation detectors 12 and 13 are arranged to detect the rotation of the fly-wheels 17 and 18 of capstans 14 and 15. The outputs of these detectors 12 and 13 are selectively supplied via a switch 19 to a capstan motor control circuit 20. During recording, the output of the circuit 20 is supplied via a switch 21 to capstan motors to cause the capstans 14 and 15 to be rotated at a given speed. The connecting positions of the switches 19 and 21 are, respectively, on the side of their terminals F in allowing the tape 1 to travel in the direction of arrow 7 (forward), and are shifted to their terminals R in allowing the tape to travel in the direction of arrow 9 (reverse). Meanwhile, the above-stated PG signal is supplied also to a window pulse generating circuit 22 and a gate pulse generating circuit 23. An operation part 24 is arranged to permit manual selection of an operation mode, such as a recording mode, or a reproduction mode and designation of a specific area to be used for recording or reproduction. The part 24 also permits selection between an operation of recording only an audio signal and an operation of recording also a video signal according to the recording pattern shown in FIG. 2. In carrying out recording, a track pitch and a tape travel direction also can be designated at the part 24.

The data which results from the manual operation on the part 24 is supplied to a system controller 25. In response to this, the system controller 25 supplies applicable data to the capstan motor control circuit 20, the switches 19 and 21, an area designating circuit 26, a gate circuit 27, an ID signal control circuit 51, etc. The area designating circuit 26 supplies area designating data to a gate pulse generating circuit 23 to obtain a desired gate pulse. In case that a video signal is also to be recorded, the area to be designated is of course the area CH1.

A gate pulse generating circuit 23 is arranged to selectively supply window pulses, which are generated from a window pulse generating circuit 22, to a gate circuit 28 for heads 3 and 4.

In recording, an analog audio signal which comes to a terminal 29 is supplied to a PCM audio signal processing circuit 30. The audio signal is then sampled at the timing mentioned in the foregoing according to the window pulses. The sampled signal is transformed into digital data before it is subjected to the signal processing operation as mentioned in the foregoing. Concurrently with this audio data, the ID data similar to those mentioned in the foregoing are also generated. The recording audio data which is thus obtained is supplied to an adder 33. At the adder 33, tracking control pilot signals (TPS's), which are generated in rotation for every field from a pilot signal generating circuit 32 in the sequence of frequencies f1→f2→f3→f4, and other pilot signals which will be described later, are added to the recording audio data. The output of the adder 33 is appropriately gated by the gate circuit 28 and is written into a desired area by the heads 3 and 4.

During reproduction, signals reproduced by the heads 3 and 4 are extracted by the gate circuit 28 according to the window pulses. A reproduced signal thus obtained is supplied via the terminal A of the switch 34 to a low-pass filter (LPF) 35 and is also supplied to the PCM audio signal processing circuit 30. The circuit 30 then performs a signal processing operation including error correction, time-base expansion, digital-to-audio conversion, etc., in a manner reverse to the processing operation for recording. A reproduced analog audio signal which is thus obtained is produced from a terminal 36.

The LPF 35 separates the above-stated TPS's and supplies them to an ATF circuit 37. The ATF circuit 37 is arranged to obtain a tracking error signal through a known four-frequency process, wherein the reproduced tracking control pilot signals (TPS's) are used together with pilot signals which are generated by a pilot signal generating circuit 32 in rotation in the same manner as in recording. However, since the tracking error signal is obtained for every area, it is sampled and held. The tracking error signal thus obtained is supplied to the capstan motor control circuit 20. Upon receipt of the error signal, the control circuit 20 performs tracking control by controlling the travel of the tape 1 under the reproducing operation through the capstans 14 and 15.

Next, in recording or reproducing a video signal, the embodiment operates as follows: When the system controller 25 produces an instruction to record a video signal, the area designating circuit 26 forcedly designates the area CH1 and causes the gate circuit 27 to operate according to the PG signal. A video signal which comes to a terminal 38 is supplied to a video signal processing circuit 39 and is processed into a signal form suited for recording. The processed signal is supplied to an adder 40. At the adder 40, the pilot signals obtained from the pilot signal generating circuit 32 is added to the processed video signal. The output of the adder 40 is supplied via the gate circuit 27 to the heads 3 and 4 to be recorded on an applicable part of the areas CH2 to CH6. Meanwhile, a PCM audio signal is recorded in exactly the same manner as the above-described operation.

In reproducing a recorded video signal, video signals picked up by the heads 3 and 4 are combined into one continuous signal via the gate circuit 27. This continuous signal is supplied to the video signal processing circuit 39 to be processed into the original signal form. The output of the signal processing circuit 39 is produced from a terminal 41. Further, the continuous signal which is obtained from the gate circuit 27 is also supplied via the terminal V of a switch 34 to the LPF 35. At the LPF 35, pilot signal components are continuously separated and supplied to the ATF circuit 37. Then, the tracking error signal which is obtained in this instance does not have to be sampled and held and is thus supplied immediately to the capstan motor control circuit 20. Meanwhile, a PCM audio signal is reproduced from the area CH1 and a reproduced analog audio signal is obtained from the terminal 36. However, in this instance, no tracking control is performed with the signal produced from the gate circuit 28.

The details of the data ID0 to ID5 are as described in the following with reference to FIG. 7 and Tables 1, 2 and 3: The data ID0 which consists of eight bits is arranged to indicate what kind of information is represented by other data ID1 to ID5. In other words, the data ID0 is main-mode-designating data. In each of modes 1 to 6, the data ID1 to ID4 represent information as shown in Table 1. More specifically, the data ID1 to ID4 indicate time information serving as a tape counter in the mode 1; time information at every cut in the mode 2; and time information in the modes 3 and 4. The data ID1 to ID4 in the mode 5 and the data ID2 to ID4 in the mode 6 indicate time information for every program. The data ID1 to ID4 in the mode 6 and the data ID2 to ID4 in the mode 7 indicate information on time as counted from the head portion or leader portion of each tape.

In Table 1, words "Pro. No." means a program Number; "Cut No." a cut number; and "File No." a file number. In the case of a system arranged to replace data with data of all "0" upon occurrence of a data error in general, such a system is preferably arranged to seldom generate data of all "0". Therefore, each data is assumed to express "0" as all "1" (or 11111111) and "1" as 11111110. Thus, in this instance, the relation of 0 and 1 of the ordinary data is assumed to be inverted. An 8-bit data Y of Table 1 is arranged to indicate information which is as shown in Table 2. The symbol Y represents the data ID5 in each of the modes 1 to 7. Referring to Table 2, the No. 0 bit of the data Y indicates whether the 8-bit data Y itself is valid or invalid. The No. 1 and No. 2 bits of the data Y indicate the form of the audio signal as to whether the audio information recorded in the above-stated two channels is monaural or stereophonic, etc. The No. 3 and No. 4 bits indicate whether the audio signal information or some other information is to be recorded in the applicable parts of the first and second channels. The No. 5 and No. 6 bits are arranged to become "1" at the beginning and end of a part having the audio signal recorded there. The No. 7 bit is arranged to become "1" in cases where dubbing is to be prevented.

TABLE 1

| Mode | ID0 | ID1 | ID2 | ID3 | ID4 | ID5 | Remarks |
|------|-----|------|------|------|------|-----|---------|
| 1 | 1 | hour | min. | sec. | File | Y | counter |

TABLE 1-continued

| Mode | ID0 | ID1 | ID2 | ID3 | ID4 | ID5 | Remarks |
|---|---|---|---|---|---|---|---|
| 2 | 2 | Pro.No. | Cut No. | min. | No. sec. | Y | cut data |
| 3 | 3 | year | month | day | day of week | Y | time |
| 4 | 4 | o'clock | min | sec. | File No. | Y | time |
| 5 | 5 | Pro.No. | hour | min. | sec | Y | program data |
| 6 | 6 | Pro.No. | hour | min. | sec. | Y | tape data |
| 7 | 7 | See Table 3 | | | | | data for multiple channel |

TABLE 2

| Bit No. | Data ID5 (or Y) in each of various modes |
|---|---|
| 0 | validity |
| 1 | the form of the audio signal |
| 2 | the form of the audio signal |
| 3 | L channel audio, etc. |
| 4 | R channel audio, etc. |
| 5 | beginning part of the record |
| 6 | ending part of the record |
| 7 | prevention of dubbing |

The details of the ID data in the mode 7 are as shown in Table 3. In the mode 7, the ID data are used in cases where the PCM audio signal is to be recorded and reproduced in or from each of the six channels by the apparatus of this kind as mentioned in the foregoing. Referring to Table 3, the data ID0 in the mode 7 is arranged to indicate the mode number of the mode 7.

TABLE 3

| ID No. | Bit No. | | | | | | | |
|---|---|---|---|---|---|---|---|---|
| | 0 | 1 | 2 | 3 | 4 | 5 | 5 | 7 |
| ID0 | 1 | 1 | 1 | 0 | 0 | 0 | 0 | 0 |
| ID1 | Tape travel direction | | Tape travel speed | | Next channel No. | | | Data for look-up |
| ID2 | Hour or min. or something else × 1 | | | | | | × 10 | Hour/min. |
| ID3 | Second or PP × 1 | | | | | | × 10 | m/t |
| ID4 | Music or chapter × 1 | | | | | | × 10 | m/c |
| ID5 | | | | | | | | Y |

The data ID1 indicates information relative to the recording format. This information is as shown in Table 3 and as follows: The No. 0 bit of the data ID1 is indicative of the tape travel direction taken for recording. The bit No. 0 is at "0" when the tape is allowed to travel for recording in the direction of arrow 7 as shown in FIG. 6 and is at "1" when the tape is allowed to travel for recording in the direction of arrow 9 as shown in the same drawing.

The No. 1 and No. 2 bits form a data indicative of a tape travel speed, i.e. the recording track pitch employed for recording. They permit setting any of track pitches of up to four different values. For example: A value "00" is indicative of a standard track pitch; a value "10" indicative of a long time recording, say, at a tape speed which is ½ of the standard speed; and values "01" and "11" indicative of third and fourth track pitches respectively.

The bits No. 3, No. 4 and No. 5 form next channel number designating data indicative of one of the areas CH1 to CH6 in which recording is to be performed next time. Since this data is composed of these three bits, it can be correlated to up to eight different kinds of information. However, a total number of channels is only six in this case. Values "100", "010", "110", "001", "101" and "011" are correlated to the areas CH1, CH2, CH3, CH4, CH5 and CH6, respectively. With the 3-bit data arranged in this manner, if the replacement data, which is obtained upon detection of an error as mentioned in the foregoing, is arranged to have its No. 2, 3 and 4 bits all become "0" or "1", the above-stated 3-bit data is clearly distinguishable from such replacement data. Further, in the event of a system wherein the replacement data is arranged to become all "0", the value "111" of the 3-bit data may be used for indicating some other information such as information indicating no change in the recording area.

The No. 6 and 7 bits of the data ID1 form look-up data for searching or a look-up operation called a leader search or the like. For example, referring to FIG. 6, in case that the audio data coming via the terminal 29 continues to be mute over a given period of time, say, two sec., the look-up data is recorded as "11" at least for a given period of, say, one second which corresponds to 60 tracks. Further, in the event that the operator wishes to play back later on a specific part of a music program by marking that part even halfway during a recording process thereon, the operator can perform a manual operation on the operation part 24 to cause the system controller 25 to issue an appropriate instruction. Then, in response to the instruction, the look-up data is recorded as "01" at the specific part for a given period of time, say, one second. In cases where such look-up arrangement is not required, the look-up data is recorded as "00".

The data ID2 is arranged to normally indicate hours or minutes information. The bits from No. 0 bit to No. 3 bit are arranged to indicate a units digit between 0 and 9. No. 4 to 6 bits are arranged to indicate a tens digit between 0 and 7, or between 0 and 5 in the case of minute information. No. 7 bit of the data ID2 is arranged to indicate whether the bits from No. 0 bit to No. 6 bit represent hour information or minute information.

The data ID3 normally indicates seconds information. The No. 0 to No. 3 bits of the data ID3 are arranged to indicate a units digit between 0 and 9. The bits from No. 4 bit to No. 6 bit are arranged to indicate a tens digit between 0 and 5. The No. 7 bit of the data ID3 is arranged to indicate whether the time information indicated by the data ID2 and ID3 relates to a length of time counted from the end of the tape or from the head or beginning of a music program.

The data ID4 indicates either a music program number or a number assigned to a chapter (a movement in a music program). Like in the case of the data ID2 and ID3, the No. 0 to 3 bits of the data ID4 indicate a units digit between 0 and 9 and No. 4 to 6 bits indicate a tens digit between 0 and 7. The No. 7 bit of the data ID4 serves as data indicating whether the bits No. 0 to No. 6 are indicating a music program number or a movement number of a musical composition.

In each of the 8-bit data ID2 to ID4, no numerical information other than 0 to 9 is arranged to be represented by the No. 0 to No. 3 bits in the modes 1 to 7. Therefore, if numerical data indicative of 10 to 14 is arranged to be formed at this part, the numerical data can be distinguished from the information indicated in each of the above-stated modes. In this specific embodiment, the following purpose can be attained by arranging such specific data (hereinafter referred to as PP) to be formed by the bits No. 0 to No. 3 of the data ID3:

As apparent from the foregoing description, the ID data in the mode 7 must be arranged to be readable even when the tape is travelling at a high speed because it includes the look-up data. Since the data ID0 has the mode number recorded therein, the data ID1 can be read out without fail when the mode number is detected from the data ID0. However, the data ID2 and the subsequent data are not so sure of being accurately read out. In other words, even if the data ID2 and ID3 are read out, the mode in which the ID data are recorded may not be clearly detected and then the information carried by them becomes meaningless. Whereas, if the specific data PP is arranged to be formed by the bits from No. 0 bit to No. 3 bit of the data ID3, it will clearly indicate that the data ID2 is recorded in the mode 7. Such arrangement ensures that at least the data ID2 is effectively usable even in the event of a high travelling speed of the tape.

The data PP, which can be formed by the bits No. 0 to No. 3, includes five kinds "0001", "0010", "0011", "0100" and "0101" which correspond to 10 to 14. A record of any one of them permits detection as the mode 7. Then, with these different kinds of the data PP used to define the meanings of the data ID2, ID4, etc., the mode 7, which is a main recording mode, can be provided with sub-recording mode. By virtue of this arrangement, the amount of additional information can be increased to a great degree. In this case, in the modes 1 to 7, the No. 4, 5 and 6 bits of the data ID3 are arranged to be capable of forming only 0 to 5 numerical data. Therefore, arrangement to provide numerical data of 6 or 7 enables to have $5 \times 2 = 10$ kinds of sub-recording modes with No. 4, 5 and 6 bits used for the data PP together with No. 0 to No. 3 bits. Especially, with the high speed travel of the tape taken into consideration, the prescription for the data ID2 is always advantageous.

Figure 7:
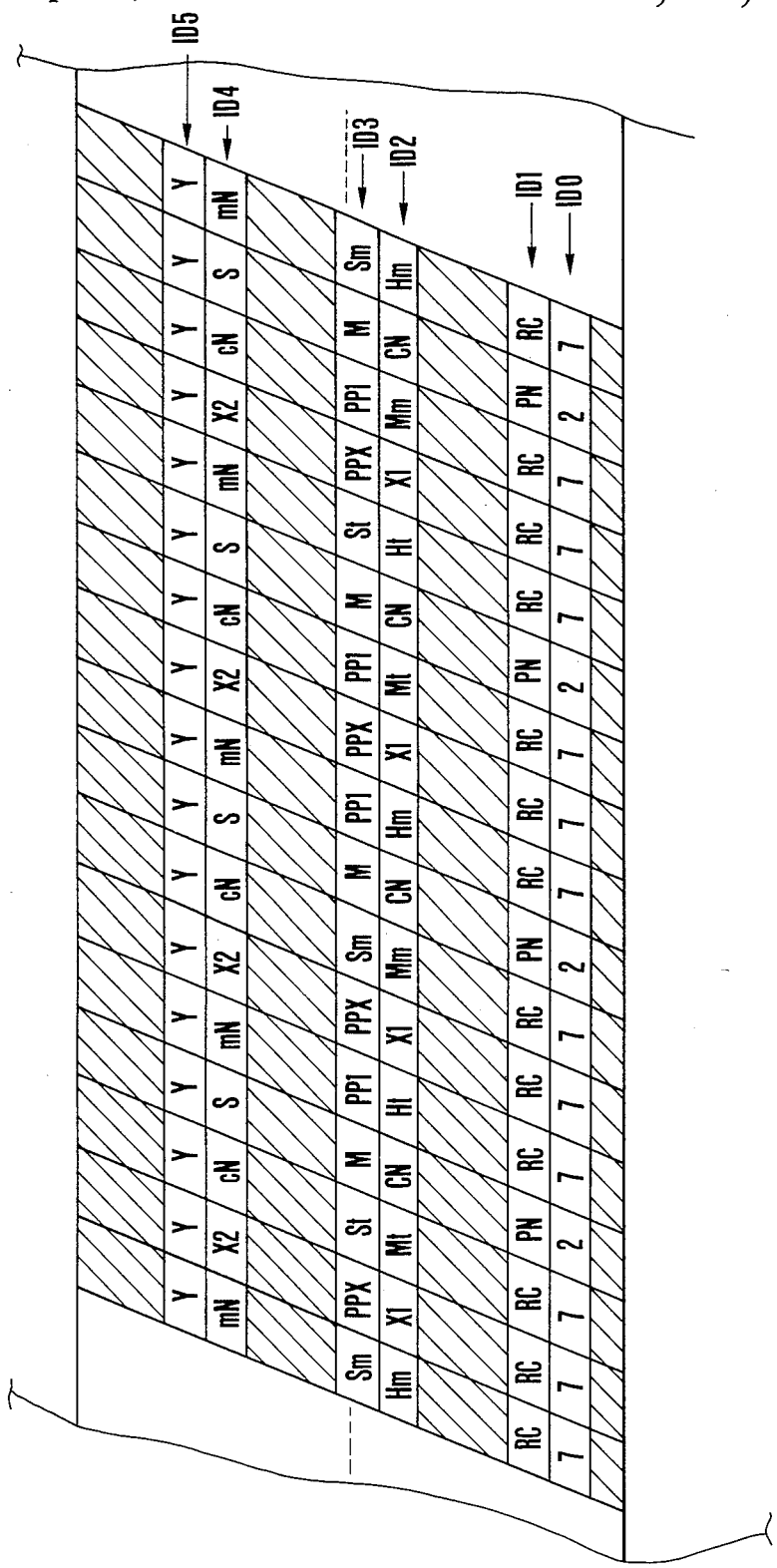
FIG. 7 is an illustration of a recording format employed by the embodiment of this invention.

FIG. 7 shows the format of recording on tape by this embodiment. The illustration shows one of the areas CH1 to CH6. Each of the data ID0 to ID5 is arranged sidewise in the longitudinal direction of the tape. Numerals shown in the part of the data ID0 indicate the mode numbers. The hatched parts in FIG. 7 indicate parts where data other than the ID data such as audio signal data, etc., are recorded.

In FIG. 7, a symbol Y indicates the data ID5 of Table 2; RC indicates information data relative to a recording format such as the one shown for the data ID1 in Table 3; PN indicates program number data corresponding to the data ID1 in the mode 2; CN indicates the cut number which corresponds to the data ID2 in the mode 2; and M and S respectively indicate minute and second values for every cut.

Further, in FIG. 7, a symbol mN indicates a musical program number; and cN indicates a chapter (or movement) number. A discrimination between them in the same mode 7 is made by the No. 7 bit of the data ID4. Symbols Hm, Mm and Sm indicate data relative to hours, minutes and seconds information for every musical program. Symbols Ht, Mt and St respectively indicate data relative to hours minutes and seconds information on a length of time counted from the end of the tape. A discrimination as to whether the time information represented by these data is for every musical program or relates to a length of time as counted from the tape end is made by means of the No. 7 bit of the data ID3. A discrimination as to whether the data ID2 indicates time in hour or in minute is made by the No. 7 bit of the data ID2.

The state of the data ID2 to ID4 shown in Table 3 becomes a first sub-mode within the mode 7. The first sub-mode obtains in cases where the data PP is not recorded at the data ID3 or where data PP1, which is a kind of the data PP, is recorded at the data ID3 as shown in FIG. 7.

The data PP1 is formed by bits from No. 0 bit to No. 6 to be different from any other data formed in other modes. For example, it is formed as "0100100". Meanwhile, No. 7 bit forms data for making a discrimination between information for each musical program and information for time from the tape end. In the tracks where the data PP1 is recorded, the data Mm, Mt, Hm and Ht are cyclically recorded at the data ID2. The arrangement of the embodiment is such that, all the information can be read even when the tape is allowed to travel at a high speed. In this specific embodiment, the format in which the ID data is recorded is arranged to complete one cycle with 16 recording tracks while FIG. 7 shows a total of 17 recording tracks.

In the data ID3, data PPX is arranged for designating another sub-mode by means of the data ID3 in the mode 7. For this, a specific data which differs from the data PP1 is arranged. In accordance with the sub-mode designated by the data PPX, the data ID2 has data X1 formed therein and the data ID4 has data PPX formed therein. In the case of the data PPX, the sub-mode can be arranged to have, for example, a letter or character code included in the data ID2 and ID4. The recording format of FIG. 7 represents one of the most preferable embodiments of this invention for the tape recorders of the kind described in the foregoing. Assuming that the recording tracks are formed in this recording pattern or format by alternately using the heads 3 and 4, the ID data in the first sub-mode of the mode 7 is always recorded at one of plus and minus azimuth angles. If it is recorded by the head 3 of the plus azimuth, the ID data which is reproduced by the head 3 is in the first sub-mode. Therefore, when the tape is allowed to travel at a high speed, the information carried by the data cN and mN of the data ID4 all becomes valid information. A discrimination as to whether the ID data is reproduced by the head 3 or reproduced by the other head 4 can be readily made in the following manner: For this purpose, the above-stated PG signal is supplied to the PCM audio signal processing circuit 30 and the discrimination can be made by seeing whether the ID data is obtained when the PG signal is at a high level or when the signal is at a low level. In accordance with the recording format shown in FIG. 7, the amount of the ID data readable as valid data under a high tape travelling speed condition can be increased to a great extent. Further, the amount of additional information also can be increased to a great degree. It is another advantage that the use of the specific data obviates the necessity of arranging additional information data, so that the above-stated advantages are attainable without causing any substantial increase in the amount of data to be recorded.

Figure 8:
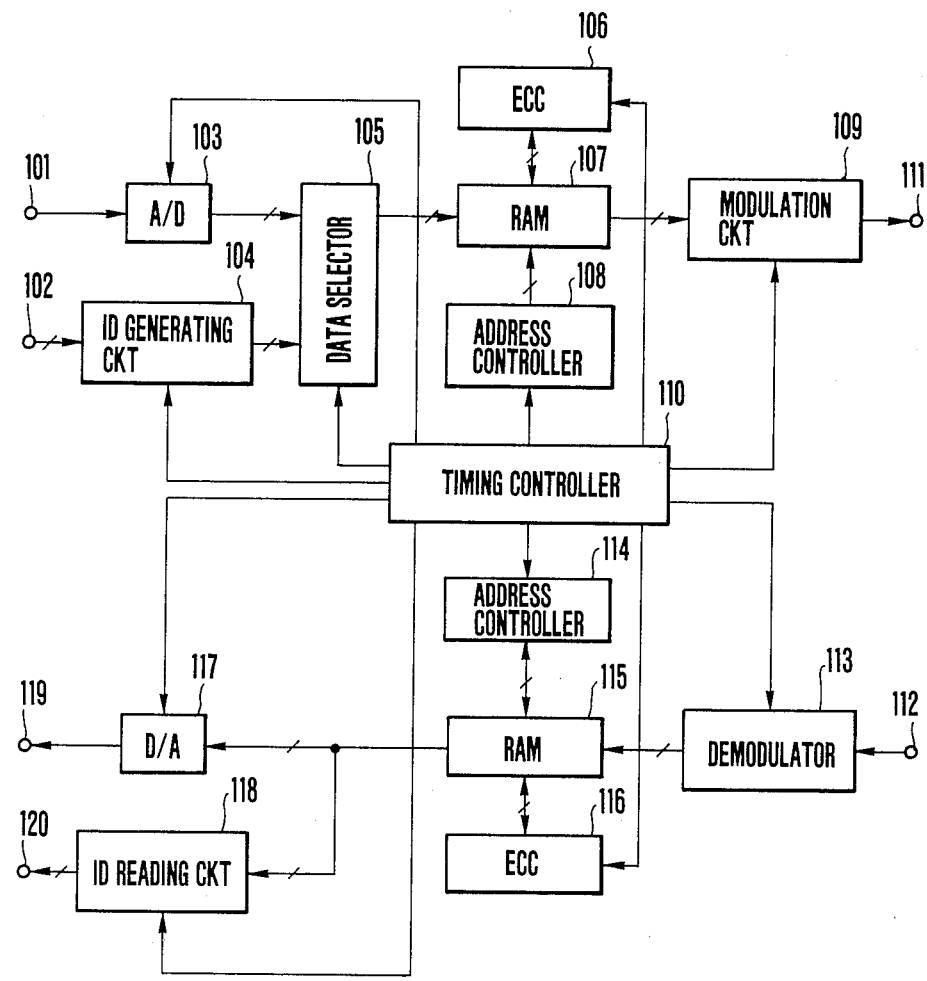
FIG. 8 is a diagram showing, by way of example, the details of a PCM audio signal processing circuit included in the arrangement shown in FIG. 6.

The arrangement of this embodiment for recording the ID data is as briefly described below:

FIG. 8 shows, by way of example, the details of the PCM audio signal processing circuit 30 of FIG. 6. Referring to FIG. 8, a terminal 101 is arranged to receive an incoming analog audio signal supplied to the terminal 29 of FIG. 6. A terminal 102 is arranged to receive the data produced from the ID control circuit 51.

The ID control circuit 51 is arranged to select some data that is to be recorded from the data received from the system controller 25. The circuit 51 then supplies the PCM audio signal processing circuit 30 with the selected data. For example, the additional data which are as shown in Tables 1, 2 and 3 are supplied to the PCM audio signal processing circuit 30 in the sequence as shown in FIG. 7. Then, as apparent from the illustration of FIG. 7, the change of the ID data from one to another is effected for every recording track. The timing for this ID data change-over is determined in accordance with the PG signal.

Again referring to FIG. 8, parallel data which come to the terminal 102 are supplied to an ID generating circuit 104 to be seriated at a given timing. Then, the seriated data is produced from the circuit 104.

Figure 4:
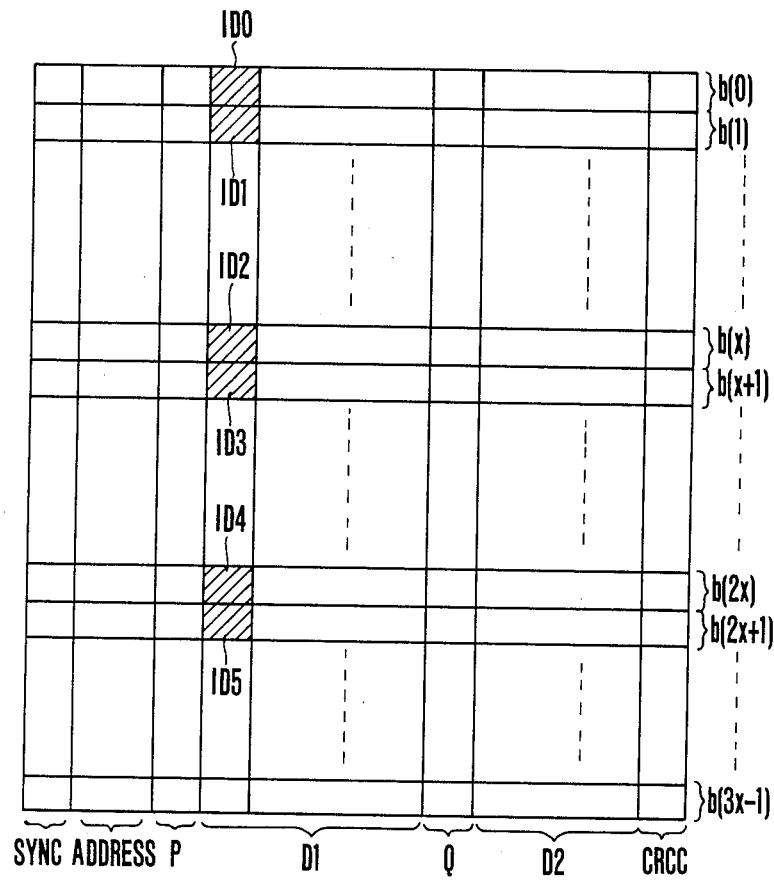
FIG. 4 is an illustration of a data matrix showing a data recording format employed by a tape recorder arranged according to this invention as an embodiment thereof.
Figure 5:
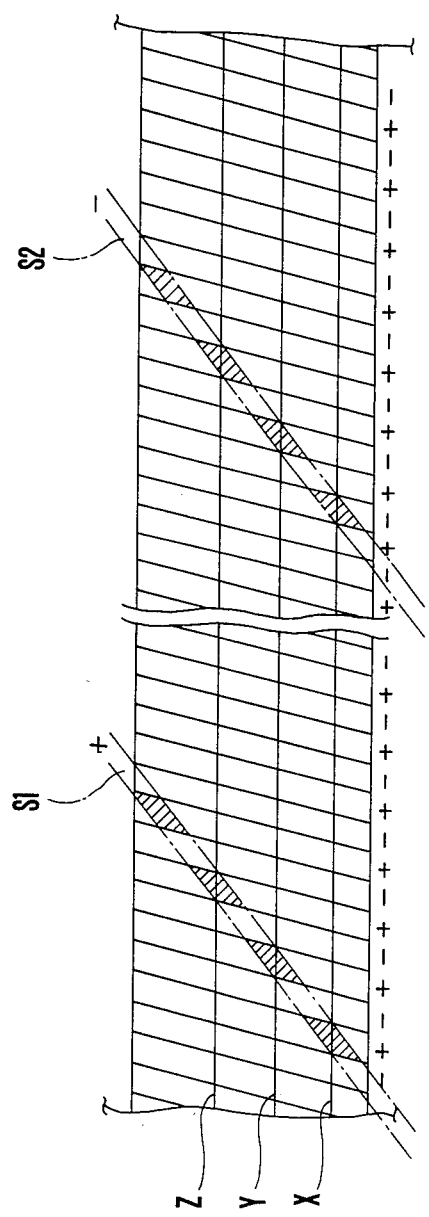
FIG. 5 is an illustration showing the tracing loci of rotary heads obtained when a recording tape is allowed to travel at a high speed.

Meanwhile, the analog audio signal which is received at the terminal 101 is supplied to an analog-to-digital (A/D) converter 103. At the A/D converter 103, the analog audio signal is sampled at a given frequency. The sampled signal is quantized. The A/D converter 103 supplies the quantized signal to a data selector 105 as a serial data. The data selector 105 supplies the output of the ID generating circuit 104 to a RAM (random access memory) 107 once in every field period at a timing corresponding to the data ID1 and supplies the output of the A/D converter 103 at another timing to the RAM 107. At the RAM 107, the parity words (P, Q), obtained from an error correction circuit (ECC), the CRCC, etc., address data obtained from an address controller 108 and the data obtained from the data selector are arranged in a manner corresponding to the data matrix shown in FIG. 4. The RAM 107 produces data which is time-base compressed in the order as mentioned in the foregoing. The data from the RAM 107 is supplied to a modulation circuit 109. The circuit 109 performs BPM (by-phase modulation), etc. for digital modulation. The modulation output of the circuit 109 is produced via a terminal 111. Then, the above-stated adder 33 receives the digital modulated audio signal via the terminal 111.

During reproduction, the digital modulated signal which comes from the gate circuit 28 is received by a terminal 112 and is demodulated by a digital demodulator 113. The demodulated signal is supplied to RAM 115, which performs a signal processing operation in a manner exactly reverse to that of the other RAM 107. More specifically, the demodulated signal is rearranged on the basis of address data obtained from an address controller 114 and also according to synchronizing data. An ECC 116 performs an error correcting operation on the demodulated signal. As a result, the data which is obtained from the columns D1 and D2 is produced from the RAM 115 and is supplied to a digital-to-analog (D/A) converter 117 and an ID reading circuit 118. The D/A converter 117 converts the input into its original audio signal and produces it via a terminal 119 to the terminal 36 of FIG. 6. Meanwhile, the ID reading circuit 118 picks up the ID data mentioned in the foregoing and supplies them to the ID detection circuit 52 of FIG. 6. The operation of each of the components of the signal processing circuit 30 shown in FIG. 8 is arranged to be synchronized by a timing signal generated from a timing controller 110.

The ID detection circuit 52 searches out the ID data and supplies the system controller 25 with the information shown in FIGS. 1, 8, 9 and 10. The system controller then controls the area designating circuit 26 and capstan motor control circuit 20 according to these data.

In the specific data described, each of the data is arranged to be 8-bit data and the specific data to be consisting of 4 or 7 bits. However, this invention is not limited to such arrangement of the embodiment.

What is claimed is:

1. A data recording apparatus comprising:
   (a) means for forming, by sampling a main information signal, main binary data consisting of an n number of bits, n being an integer;
   (b) means for forming a plurality of subordinate binary data of an n number of bits representing additional information of different kinds respectively, one of said plural subordinate binary data being mode number data which is arranged to determine the meaning of the additional information carried by other subordinate binary data;
   (c) means for recording said main binary data and said plurality of subordinate data, said recording means forming recording tracks having a first magnetizing direction alternately with tracks having a second magnetizing direction which differs from said first magnetizing direction; and
   (d) means for forming a data sequence including said main binary data and said plurality of subordinate data to supply said data sequence to said recording means with a timing so that said main binary data sampled during a predetermined period of time and said plurality of subordinate binary data are recorded on the one track by said recording means, and all of said mode number data recorded in the tracks of said first magnetizing direction are first data while at least some of said mode number data recorded in said recording tracks of said second magnetizing direction are second data which differs from said first data.

2. An apparatus according to claim 1, wherein said plurality of subordinate binary data, recorded in a recording track where said mode number data is said first data includes first subordinate binary data indicative of the recording condition of said recording means.

3. An apparatus according to claim 2, wherein said recording means is arranged to be capable of setting a track pitch of said recording tracks at a plurality of different pitches; and said first subordinate binary data includes data indicative of said track pitch.

4. An apparatus according to claim 2, wherein said recording means includes means for moving said recording medium; and said first subordinate binary data includes data indicative of the direction in which said recording medium is moved by said moving means.

5. An apparatus according to claim 2, wherein said data sequence forming means is arranged to form the data sequence with the timing so that said first subordinate binary data is recorded in a position nearest to said mode number data in the recording track among said plurality of subordinate binary data in which said mode number data is said first data.

6. An apparatus according to claim 5, wherein said plurality of subordinate binary data further includes second subordinate binary data indicative of time information relative to the recording operation of said recording means.

7. An apparatus according to claim 2, wherein said recording means includes first and second rotary magnetic heads which differ in their magnetizing direction from each other; said first rotary head forms recording tracks having said first magnetizing direction; and said second rotary magnetic head forms recording tracks having said second magnetizing direction.

8. A data recording apparatus comprising:
(a) means for forming, by sampling a main information signal, main binary data consisting of an n number of bits, n being an integer;
(b) means for forming a plurality of subordinate binary data of a n number of bits indicative of different kinds of additional information respectively, the plurality of subordinate binary data including first subordinate binary data consisting of an i number of bits ( i being an integer not exceeding n) and (n −i) number of bits, said i number of bits being arranged to determine the information represented by said (n-i) number of bits;
(c) means for recording said main binary data and said plurality of subordinate binary data, said recording means forming recording tracks one after another; and
(d) means for forming a data sequence including said main binary data and said plurality of subordinate binary data to supply said data sequence to said recording means with a timing so that said main binary data sampled during a predetermined period of time and said plurality of subordinate binary data are recorded on the one track by said recording means, and a plurality of kinds of said first subordinate binary data respectively including said i number of bits of different kind is periodically recorded by said recording means in a predetermined number of recording tracks within each recording period of said first subordinate binary data.

9. An apparatus according to claim 8, wherein said plurality of subordinate binary data further include second subordinate binary data consisting of a j number of bits (j being an integer not exceeding n) and (n−j) number of bits, said j number of bits being arranged to determine the information represented by said (n −i) number of bits, and said data sequence forming means being arranged to form the data sequence with the timing so that said second subordinate binary data including said j number of bits of different kinds is periodically recorded by said recording means in said predetermined number of recording tracks within each recording period of said second subordinate binary data.

10. An apparatus according to claim 9, wherein said j number of bits is further arranged to determine information represented by said first subordinate binary data.

11. An apparatus according to claim 10, wherein there obtains a relation of i −j = 1; and each of said first and second subordinate binary data is arranged in two different kinds.

12. An apparatus according to claim 11, wherein a combination of (2×2 =) 4 kinds of said first and second subordinate binary data are periodically recorded by said recording means in a predetermined number of recording tracks within each recording period of said combination.

13. An apparatus according to claim 12, wherein each of said first and second subordinate binary data is indicative of time information relative to the recording operation of said recording means.

14. An apparatus according to claim 13, wherein said first subordinate binary data indicates said time information either in hour or in minute; and said one-bit data of said first subordinate binary data indicates whether said time information is in hour or in minute.

15. An apparatus according to claim 14, wherein said second subordinate binary data indicates said time information in second; and the one-bit data of said second subordinate binary data indicates whether the time information represented by said first and second subordinate binary data indicates a length of recording time for every recording medium or for every program included in said main information signal.

16. An apparatus according to claim 12, wherein said data sequence for forming means are arranged to form said data sequence with a timing so that, within each of said recording tracks, said recording means records said second subordinate binary data in a position nearest to said first subordinate binary data among said plurality of subordinate binary data.

17. An apparatus according to claim 12, wherein said plurality of subordinate binary data further includes third subordinate binary data consisting of one specific bit and other (n −1) number of bits, said specific bit is arranged to determine the information represented by said (n −1) bits of the third subordinte binary data; and said data sequence forming means is arranged to form the data sequence with a timing so that said recording means periodically records said third subordinate binary data of two different kinds having different specific bit in a given number of recording tracks within each recording period of said third subordinate binary data.

18. An apparatus according to claim 8, wherein said plurality of subordinate binary data further includes mode number data which determines the meaning borne by said additional information carried by other subordinate binary data.

19. An apparatus according to calim 18, wherein said recording means forms recording tracks having a first magnetizing direction alternately with recording tracks having a second magnetizing direction which differs from said first direction; said data sequence forming means being arranged to form the data sequence with a timing so that said mode number data which is recorded in each of the tracks of said first magnetizing direction is first data; and at least some of said mode number data recorded in the recording tracks of said second magnetizing direction is second data which differs from said first data.

20. An apparatus according to claim 19, wherein said data sequence forming means is arranged to form the data sequence with a timing so that said first subordinate binary data is recorded by said recording means only in each of the recording tracks in which said mode number data is said first data.

* * * * *